US012780453B2

(12) United States Patent
Yoshida et al.

(10) Patent No.: US 12,780,453 B2
(45) **Date of Patent: *Nov. 3, 2026**

(54) INFORMATION PROCESSING DEVICE FOR DETECTING SPACE-OBJECT MANEUVERS

(71) Applicant: NEC Corporation, Tokyo (JP)

(72) Inventors: Jun Yoshida, Tokyo (JP); Makoto Tanaka, Tokyo (JP); Masatoshi Ebara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 127 days.

This patent is subject to a terminal disclaimer.

(21) Appl. No.: 18/711,974

(22) PCT Filed: Mar. 25, 2022

(86) PCT No.: PCT/JP2022/014410

§ 371 (c)(1),
(2) Date: May 21, 2024

(87) PCT Pub. No.: WO2023/181355

PCT Pub. Date: Sep. 28, 2023

(65) Prior Publication Data

US 2025/0002182 A1 Jan. 2, 2025

(51) Int. Cl.
*B64G 3/00* (2006.01)

(52) U.S. Cl.
CPC .................................... *B64G 3/00* (2013.01)

(58) Field of Classification Search
CPC .................................. B64G 3/00; G06N 3/08
See application file for complete search history.

(56) References Cited

U.S. PATENT DOCUMENTS

2014/0037150 A1* 2/2014 Kamei ................ G06V 10/809 382/115
2015/0274328 A1* 10/2015 Wallner .................. B64G 3/00 701/519
2015/0292951 A1 10/2015 Hoshino et al.
2019/0123988 A1* 4/2019 Leverich ............ H04L 41/0686
(Continued)

FOREIGN PATENT DOCUMENTS

CN 111241716 A 6/2020
JP 2011-112284 A 6/2011
(Continued)

OTHER PUBLICATIONS

Methods of Machine Learning for Space Object Pattern Classification Yang Ying1, Zhou Ziyu 2, Zhou Qingrui1, Ma Rong1, Chen Pei2 1. Qian Xuesen Laboratory of Space Technology, Beijing 100094, P. R. China 2. Beihang University, Beijing 100191, P. R. China (Year: 2019).*

(Continued)

*Primary Examiner* — Donald J Wallace
*Assistant Examiner* — Jalal C Coduroglu
(74) *Attorney, Agent, or Firm* — Sughrue Mion, PLLC

(57) ABSTRACT

The information processing device 2X includes a data acquisition means 32X and a maneuver detection means 33X. The data acquisition means 32X acquires time series data indicating an observed position and time of a space object equipped with a propulsion system. The maneuver detection means 33X detects a maneuver by use of the propulsion system of the space object, based on the time series data.

7 Claims, 11 Drawing Sheets

100: OBSERVATION SYSTEM

(56) References Cited

U.S. PATENT DOCUMENTS

| | | | | |
|---|---|---|---|---|
| 2019/0353747 | A1* | 11/2019 | Fowe | G01S 5/0284 |
| 2019/0353799 | A1 | 11/2019 | Grant et al. | |
| 2021/0261276 | A1* | 8/2021 | Tack | G06N 3/088 |
| 2021/0364307 | A1* | 11/2021 | Kracun | G01C 21/3484 |
| 2022/0411109 | A1* | 12/2022 | Ohno | G01S 19/423 |
| 2023/0237386 | A1* | 7/2023 | Raut | G06F 18/2148 706/12 |
| 2025/0002182 | A1* | 1/2025 | Yoshida | B64G 3/00 |

FOREIGN PATENT DOCUMENTS

| | | | | |
|---|---|---|---|---|
| JP | 5709651 | B2 | 4/2015 | |
| JP | 2015-202809 | A | 11/2015 | |
| JP | 2020-504820 | A | 2/2020 | |
| WO | 2020/085412 | A1 | 4/2020 | |
| WO | WO-2022137411 | A1 * | 6/2022 | B64G 1/68 |

OTHER PUBLICATIONS

Maneuver detection methods for space objects based on dynamical model Shengxian Yu ⇑, Xin Wang, Tinglei Zhu Purple Mountain Observatory, Chinese Academy of Sciences, Nanjing 210023, China Key Laboratory of Space Object and Debris Observation, Chinese Academy of Sciences, Nanjing 210023, China (Year: 2021).*

International Search Report for PCT Application No. PCT/JP2022/014410, mailed on Jun. 14, 2022.

* cited by examiner

| t1 − t11 | t11 − t12 | t12 − t13 | t13 − t14 | t14 − t15 | t15 − t2 |
|---|---|---|---|---|---|
| 1 | 0 | 0 | 0 | 0 | 0 |

0: MANEUVER UNDETECTED 1: MANEUVER DETECTED

FIG. 6

| TIME | WHETHER MANEUVER DETECTED OR NOT |
|---|---|
| 2022/9/20 12:30:54 | 1 (DETECTED) |
| 2022/9/20 12:53:14 | 0 (UNDETECTED) |
| 2022/9/20 13:30:16 | 0 (UNDETECTED) |
| 2022/9/20 13:33:32 | 0 (UNDETECTED) |
| ... | ... |

INFORMATION PROCESSING DEVICE FOR DETECTING SPACE-OBJECT MANEUVERS

This application is a National Stage Entry of PCT/JP2022/014410 filed on Mar. 25, 2022, the contents of all of which are incorporated herein by reference, in their entirety.

TECHNICAL FIELD

The present disclosure relates to the technical field of an information processing device, a detection method, and a storage medium for performing processing relating to a detection of a maneuver of a space object.

BACKGROUND

There is a technology on a maneuver detection (detection of an orbital maneuver) of a space object such as an artificial satellite. For example, Patent Literature 1 discloses a technique for making a Kalman filter model which can deal with various motions such as a linear motion, a spiral motion, and a serpentine motion, to thereby track a target object while suppressing the predicted orbit error even if there is an orbit change due to a maneuver or the like.

CITATION LIST

Patent Literature

Patent Literature 1: JP Patent No. 5709651

SUMMARY

Problem to be Solved

In a difficult task such as orbit prediction as described in Patent Literature 1, the maneuver detection result can be affected by the orbit prediction error, or a model construction for orbit correction can be required.

In view of the above-described issue, it is therefore an example object of the present disclosure to provide an information processing device, a detection method, and a storage medium capable of suitably detecting the occurrence of a maneuver of a space object.

Means for Solving the Problem

One aspect of the information processing device is an information processing device including:

- a data acquisition means configured to acquire time series data indicating an observed position and time of a space object equipped with a propulsion system; and
- a maneuver detection means configured to detect a maneuver by use of the propulsion system of the space object, based on the time series data.

One aspect of the detection method is a detection method executed by a computer, the detection method including:

- acquiring time series data indicating an observed position and time of a space object equipped with a propulsion system; and
- detecting a maneuver by use of the propulsion system of the space object, based on the time series data.

One aspect of the storage medium is a storage medium storing a program executed by a computer, the program causing the computer to:

- acquire time series data indicating an observed position and time of a space object equipped with a propulsion system; and
- detect a maneuver by use of the propulsion system of the space object, based on the time series data.

Effect

An example advantage according to the present disclosure is to suitably detect the occurrence of a maneuver of a space object.

BRIEF DESCRIPTION OF THE DRAWINGS

FIG. 6 It is an example of a table showing the transition of the detection results of maneuver.

EXAMPLE EMBODIMENTS

Hereinafter, example embodiments of an information processing device, a detection method, and a storage medium will be described with reference to the drawings.

First Example Embodiment (1) System Configuration

Figure 1:
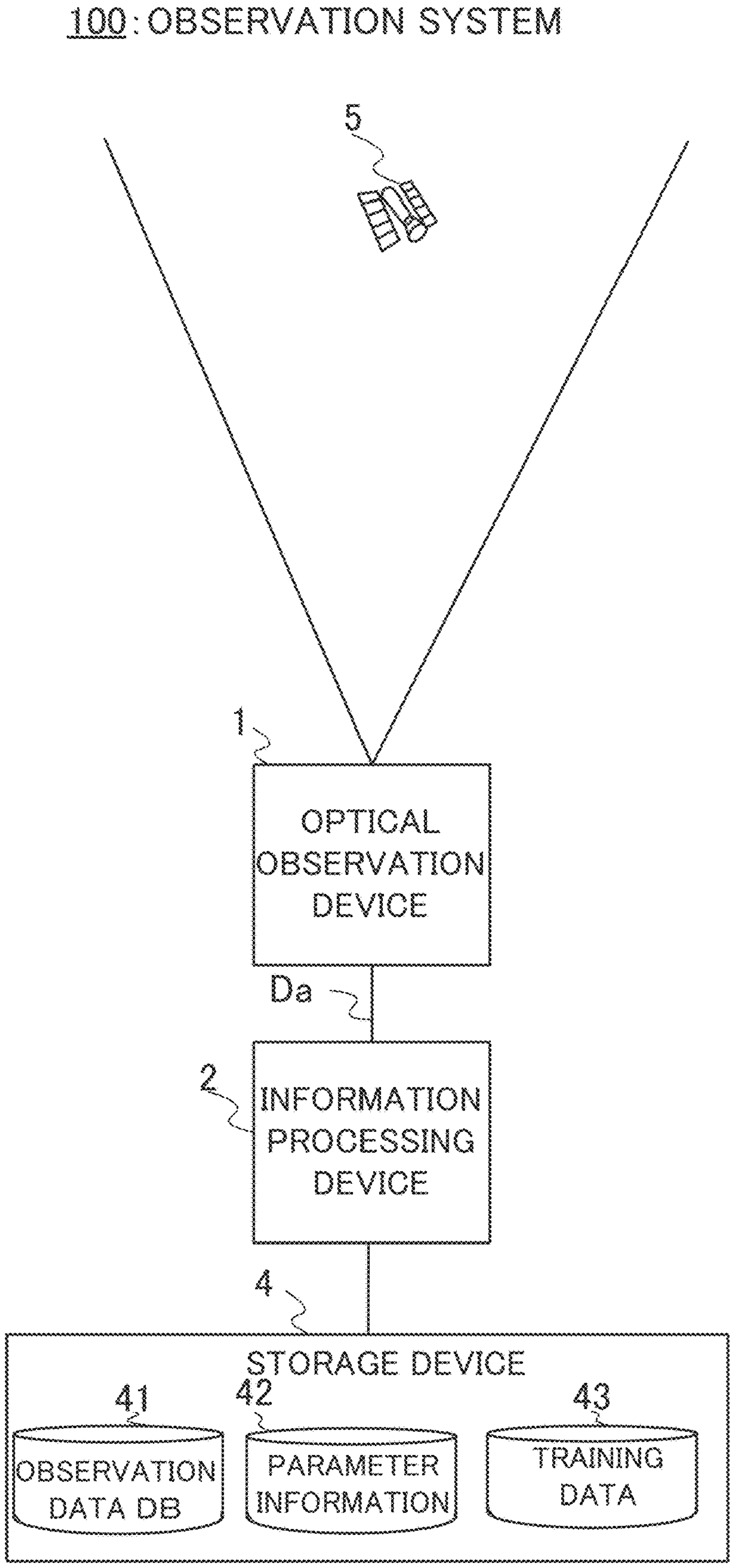
FIG. 1 It illustrates a configuration of an observation system according to a first example embodiment.

FIG. 1 shows a configuration of an observation system 100 according to the first example embodiment. The observation system 100 is a system for detecting a maneuver (more specifically, an orbital maneuver) such as a satellite, and mainly includes an optical observation device 1, an information processing device 2, and a storage device 4.

The optical observation device 1 is installed on the ground and optically observes a space object 5 such as a satellite which is a target object of observation existing in the sky. Then, the optical observation device 1 supplies observation data "Da" indicating the observation result regarding the space object 5 to the information processing device 2. The space object 5 is an artifact orbiting the earth and equipped with a propulsion system for changing the orbit, and examples thereof include an artificial satellite.

Figure 2:
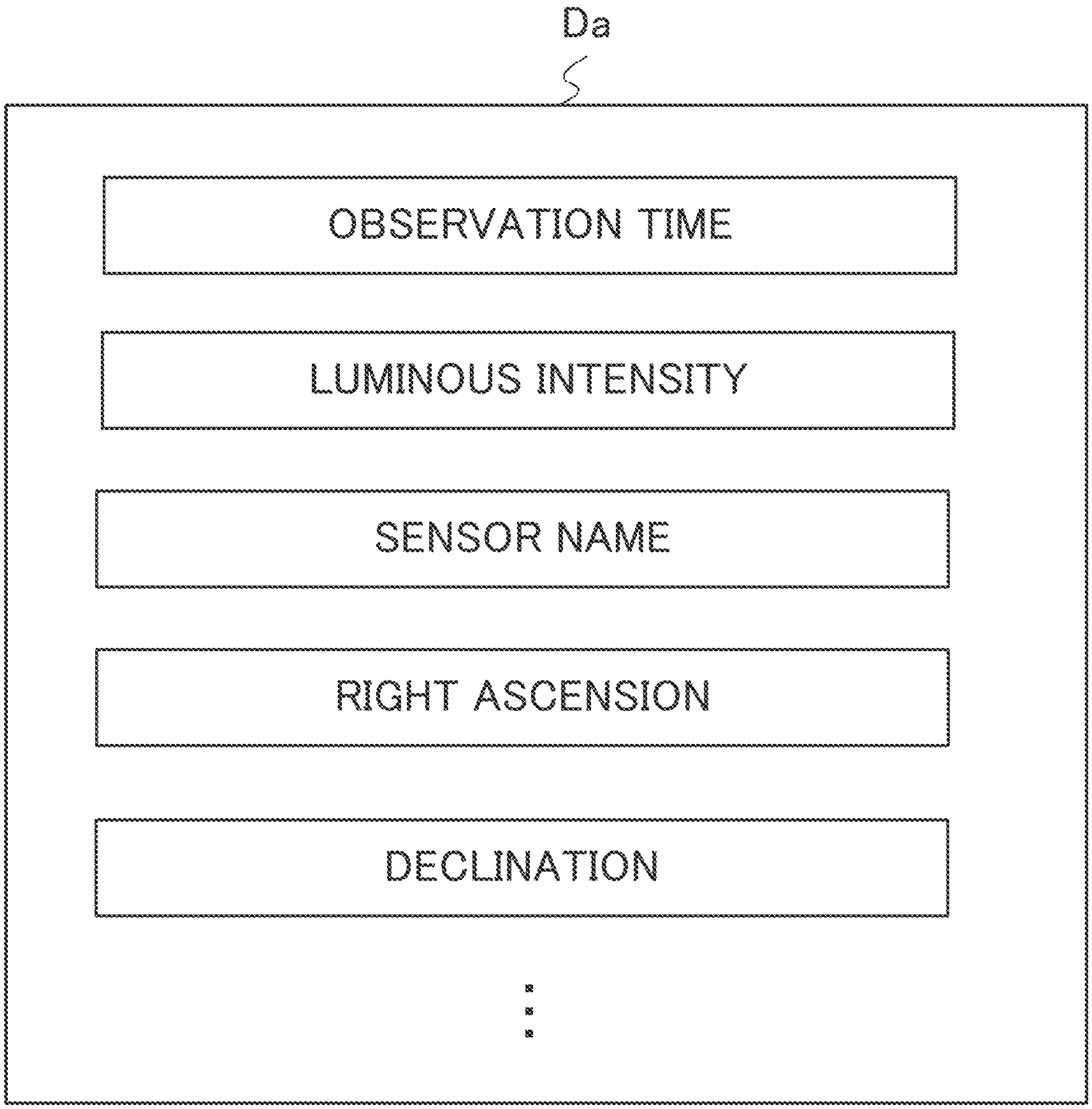
FIG. 2 It illustrates an example of the data structure of observation data.

FIG. 2 illustrates an exemplary data structure of the observation data Da. The observation data Da mainly includes information indicating the observation time, luminous intensity, sensor name, right ascension, and declination, respectively. Here, the "observation time" indicates the observation time when the corresponding luminous intensity was observed, and functions as a time stamp. The "luminous intensity" indicates the light intensity (luminance) of the observed space object 5. The "sensor name" indicates the name or ID of a sensor for observing the luminous intensity provided in the optical observation device 1 or the optical observation device 1. The "right ascension" and "declination" indicate the position coordinates representing the observed position of the space object 5 in the equatorial coordinate system. The position coordinates may be relative position coordinates with reference to a specific celestial body or an object.

Since the observation feasibility of the space object 5 is affected by the weather or the like, there is a time period in which the space object 5 cannot be observed. Therefore, the observation data Da generated by the optical observation device 1 becomes timewise discontinuous time series data (i.e., data with observation intervals which are not always constant).

With reference again to FIG. 1, each element of the observation system 100 will be described. The information processing device 2 performs a process (also referred to as "maneuver detection related process") related to the maneuver detection of the space object 5, based on the time variation in the illuminous intensity and the position indicated by time series observation data Da supplied from the optical observation device 1.

The storage device 4 is one or more memories configured to store various kinds of information necessary for the information processing device 2 to perform the maneuver detection related process. For example, storage device 4 stores observation data DB 41, parameter information 42, and training data 43.

The observation data DB 41 is a database of the observation data Da supplied from the optical observation device 1 to the information processing device 2. Upon receiving the observation data Da from the optical observation device 1, the information processing device 2 adds a record corresponding to the received observation data Da to the observation data DB 41. The observation DB 41 may further include information indicating a processing result from the information processing device 2 such as a detection result of the maneuver.

The parameter information 42 indicates parameters of a model (also referred to as "maneuver detection model") used for maneuver detection. The maneuver detection model may be, for example, a learning model based on machine learning, and it may be a learning model based on a neural network, any other type of a learning model such as a support vector machine, or a combination thereof. In the present example embodiment, as an example, a binary classification model is used as the maneuver detection model. In this case, the maneuver detection model is trained so as to output a classification result indicating whether or not it is immediately after the occurrence of a maneuver, when time series data indicating the observation results of the space object 5 is inputted thereto as input data. If the maneuver detection model is equipped with the architecture of a neural network, the parameter information 42 stores various parameters such as the layer structure, the neuron structure of each layer, the number of filters and filter size in each layer, and the weight for each element of each filter.

The maneuver detection model is not limited to a binary classification model, and may be a three or more valued classification model that are trained to output a detailed classification result on the state or/and the degree of the maneuver when it is determined that a maneuver has occurred. For example, in this case, the maneuver detection model may be a classification model configured to perform ternary classification among "immediately after occurrence of maneuver", "during maneuver", and "others".

The training data 43 is training data used to train the maneuver detection model. The training data 43 includes time series data in which the luminous intensity, right ascension, and declination of the space object 5 during a certain time period observed in the past are associated with each observation time, and correct answer data indicating whether each observation time falls under the time immediately after a maneuver of the space object 5.

The storage device 4 may be an external storage device, such as a hard disk, that is connected or embedded in the information processing device 2, or may be a storage medium, such as a flash memory, that is detachable from the information processing device 2. The storage device 4 may be configured by one or more server devices that perform data communication with the information processing device 2. The database or the like stored in the storage device 4 may be stored in a plurality of devices or storage media dispersedly.

The configuration of the observation system 100 shown in FIG. 1 is an example, and various changes may be made to the configuration. For example, the optical observation device 1 and the information processing device 2 may be configured integrally. Similarly, the information processing device 2 and the storage device 4 may be configured as a single unit. Further, the information processing device 2 may be configured by a plurality of devices. In this case, the plurality of devices constituting the information processing device 2 exchange information necessary to execute the processing allocated in advance with one another. In this case, the information processing device 2 functions as an information processing system.

(2) Hardware Configuration of Information Processing Unit

Figure 3:
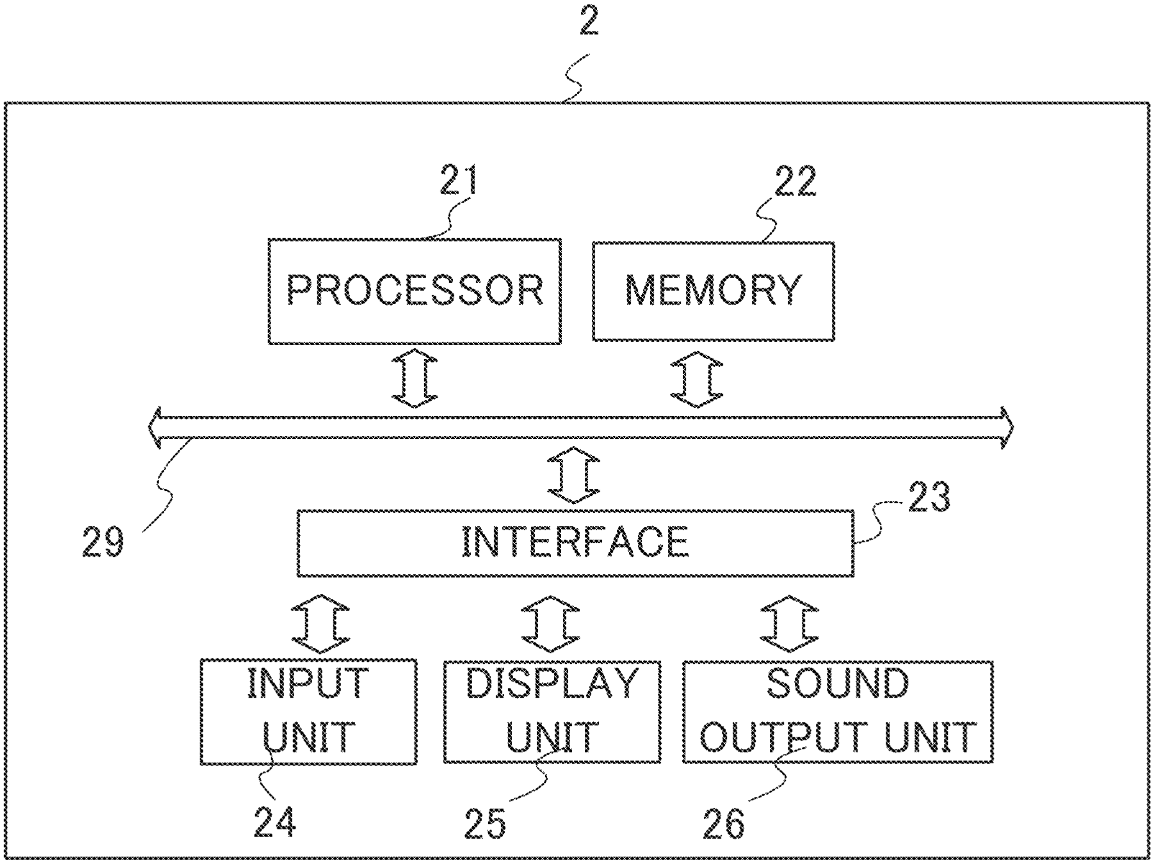
FIG. 3 It illustrates an example of a block configuration of an information processing device.

FIG. 3 shows an example of the block configuration of the information processing device 2. The information processing device 2 includes a processor 21, a memory 22, and an interface 23 as hardware. The processor 21, the memory 22, and the interface 23 are connected to one another via a data bus 29.

The processor 21 executes a predetermined process by executing a program stored in the memory 22. The processor 21 is a processor such as a CPU (Central Processing Unit), a GPU (Graphics Processing Unit), and a TPU (Tensor Processing Unit). The processor 21 may be configured by a plurality of processors. The processor 21 is an example of a computer.

The memory 22 is configured by various volatile memories and non-volatile memories such as a RAM (Random Access Memory) and a ROM (Read Only Memory). Further, a program for executing various kinds of the process by the information processing device 2 is stored in the memory 22. The memory 22 is used as a working memory to temporarily store information and the like acquired from the storage device 4. The memory 22 may function as the storage device 4. Similarly, the storage device 4 may function as the memory 22 of the information processing device 2. The program executed by the information processing device 2 may be stored in a storage medium other than the memory 22.

The interface 23 is one or more interfaces for electrically connecting the information processing device 2 to other devices by wired or wirelessly. Examples of the interfaces include a wireless interface, such as a network adapter, for transmitting and receiving data to and from other devices wirelessly, and a hardware interface, such as a cable, for connecting to other devices. In the present example embodiment, the interface 23 performs the interface operation of the input unit 24, the display unit 25, and the sound output unit 26 which are included in the information processing device 2.

The input unit 24 is a user interface for the user of the observation system 100 to input predetermined information, and examples thereof include, a button, a switch, a touch panel, and a voice input device. The display unit 25 is, for example, a display or a projector, and displays predetermined information under the control of the processor 21. The sound output unit 26 is, for example, a speaker, and outputs sound under the control of the processor 21. Each of the input unit 24, the display unit 25, the sound output unit 26 may be an external device that is electrically connected by wire or wirelessly via the interface 23 to the information processing device 2. The interface 23 may perform an interface operation of any device other than the input unit 24, the display unit 25, and the sound output unit 26.

(3) Maneuver Detection Related Process

Figure 4:
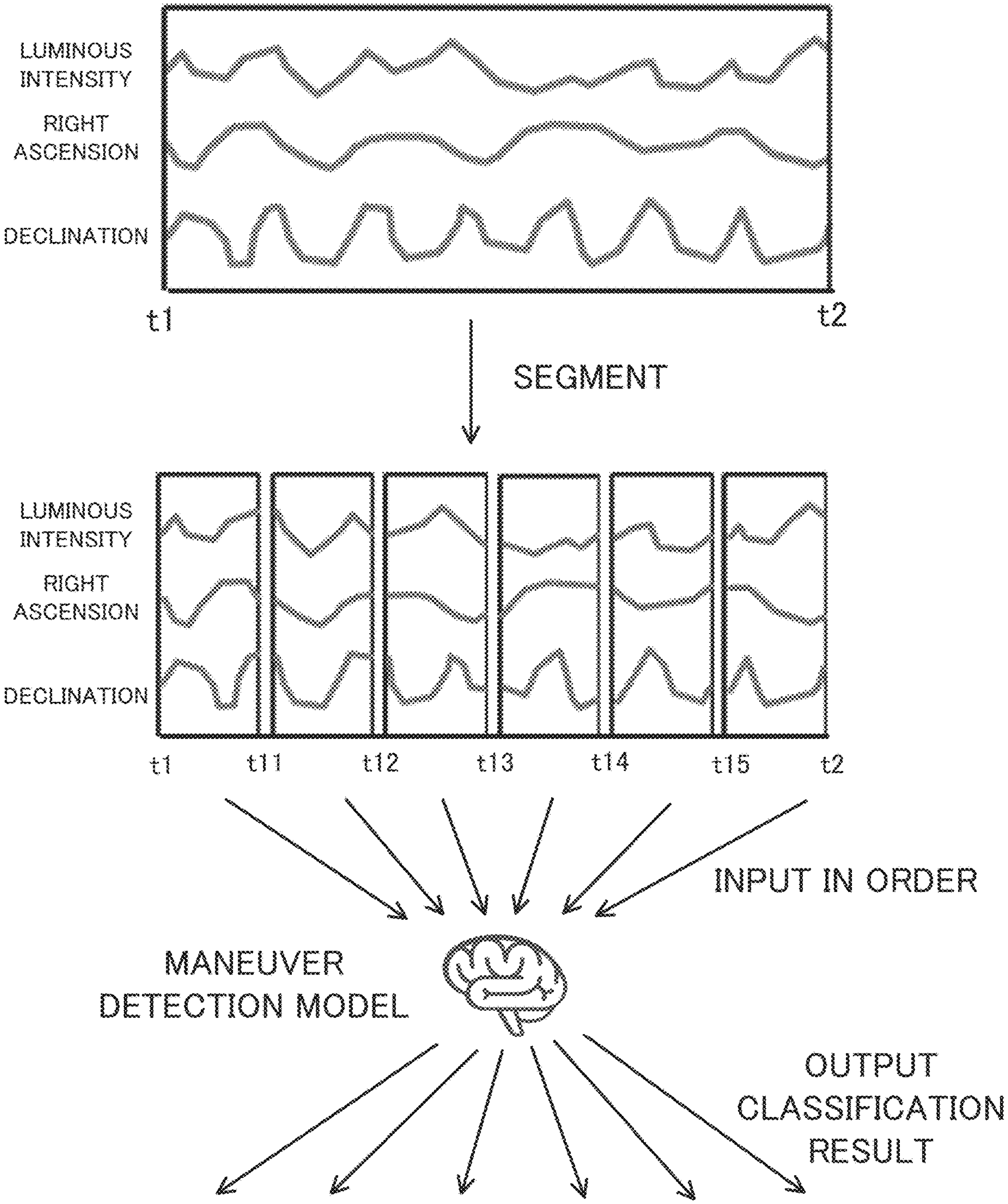
FIG. 4 It is a diagram showing an outline of a maneuver detection related process.

First, an outline of maneuver detection related process will be described with reference to FIG. 4. FIG. 4 is a diagram showing an outline of the maneuver detection related process. In FIG. 4, for convenience of explanation, there are provided graphs connecting the plots of the luminous intensity, the plots of the right ascension, and the plots of the declination which are observed at observation times, respectively.

First, the information processing device 2 divides (segment) the time series data of luminous intensity, right ascension, and declination indicated by the time series observation data Da supplied from the optical observation device 1 based on a predetermined rule. In FIG. 4, there are six pieces of generated data obtained by dividing the time series data of luminous intensity, right ascension, and declination observed during the period from the time t1 to the time t2. Hereafter, a piece of data generated by dividing the time series data is also referred to as "segment data". There are herein generated segment data which corresponds to the observation period from time t1 to time t11, segment data which corresponds to the observation period from time t11 to time t12, segment data which corresponds to the observation period from time t12 to time t13, segment data which corresponds to the observation period from time t13 to time t14, segment data which corresponds to the observation period from time t14 to time t15, and segment data which corresponds to the observation period from time t15 to time t2, respectively. Since there is such a period in which the optical observation device 1 cannot observe the space object 5 due to weather or the like, the observation intervals of the space object 5 are not always constant. Therefore, for example, even if the number of pieces of the observation data Da included in each segment data is set to be constant, the length of the observation period corresponding to each segment data is not always constant.

Next, the information processing device 2 inputs the segment data to the maneuver detection model in order. Here, when the maneuver detection model is a binary classification model, the maneuver detection model outputs the classification result indicative of whether or not the observation period of the inputted segment data was a period immediately after the maneuver occurrence when segment data is inputted thereto. The maneuver detection model outputs "0" when the observation period of the inputted segment data was not the period immediately after the maneuver occurrence while outputting "1" when the observation period of the input segment data was the period immediately after the maneuver occurrence. Thereafter, the information processing device 2 displays, or outputs by audio, information on the above-described classification result.

In FIG. 4, there is provided an example of generating a plurality of segment data obtained by segmenting the time series data, upon accumulating time series data with a specific length. Alternatively, the information processing device 2 may perform maneuver detection based on the segment data, upon obtaining the observation data Da required to generate segment data, as will be described later. Thereby, the information processing device 2 can detect the occurrence of the maneuver at an earlier stage.

Figure 5:
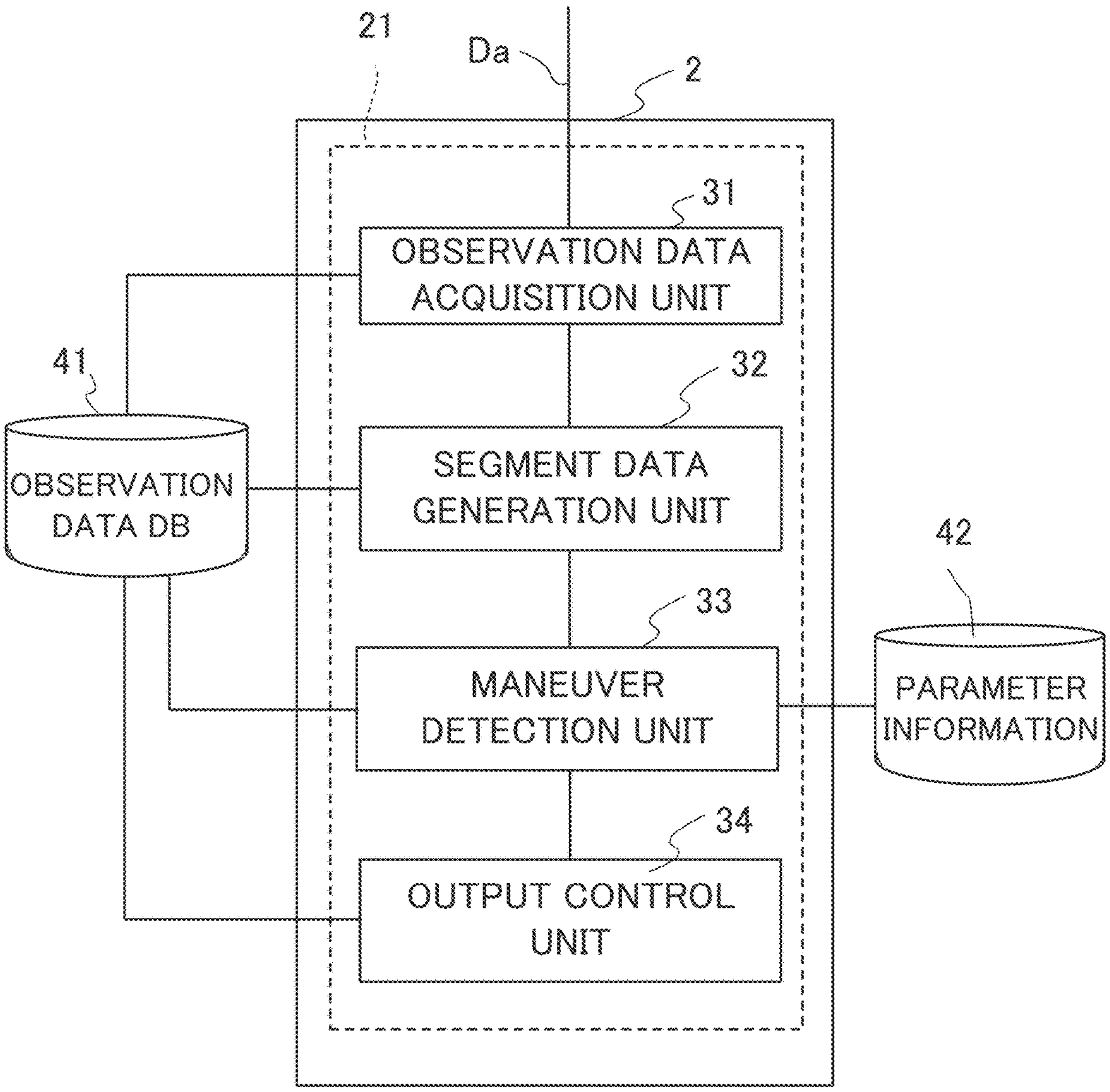
FIG. 5 It illustrates an example of function blocks related to the maneuver detection related process.

FIG. 5 is an example of a functional block relating to maneuver detection related process. The processor 21 of the information processing device 2 functionally includes an observation data acquisition unit 31, a segment data generation unit 32, a maneuver detection unit 33, and an output control unit 34. In FIG. 5, blocks for transmitting and receiving data with each other are connected by a solid line, but the combination of blocks for transmitting and receiving data with each other is not limited thereto. The same applies to the drawings of other functional blocks described below.

The observation data acquisition unit 31 acquires the observation data Da indicating the observation result of the space object 5 from the optical observation device 1 through the interface 23. Then, the observation data acquisition unit 31 stores the acquired observation data Da in the observation data DB 41. In addition to storing the observation data Da in the observation data DB 41, or in place of that process, the observation data acquisition unit 31 may supply the observation data Da to the segment data generation unit 32.

The segment data generation unit 32 generates segment data based on the observation data Da acquired by the observation data acquisition unit 31. The segment data herein indicates observed values of the luminous intensity and position and the observed times of the space object 5 observed in time series during a certain time period, and is generated by the observed data Da corresponding to a predetermined number of the observed times. The predetermined number described above may be a predetermined constant or may be a variable number. The segment data generation unit 32 supplies the generated segment data to the maneuver detection unit 33.

A supplementary description will be given of the case where the predetermined number described above is a variable number. For example, the segment data generation unit 32 divides the time series observation data Da so as to mark the boundaries at discontinuous timings (e.g., any timing when unobserved duration becomes equal or larger than a predetermined time length) of the observation of the space object 5 by the optical observation device 1. Then, for each group of the divided observation data Da, the segment data generation unit 32 generates segment data. According to this approach, the segment data generation unit 32 can determine each segment data to be a group of the observation data Da with similar observation times. Thus, it is possible to improve the accuracy of the detection result of the maneuver. Also in this case, the upper limit number of the observation data Da to be included in a single piece of segment data may be determined in advance.

The maneuver detection unit 33 detects a maneuver of the space object 5 at the observation time corresponding to the segment data based on the segment data generated by the segment data generation unit 32. In this case, the maneuver detection unit 33 configures the maneuver detection model based on the parameter information 42 and inputs segment data to the maneuver detection model. Then, the maneuver detection unit 33 determines whether or not there is a maneuver of the space object 5 based on the information outputted by the maneuver detection model in response to the input. For example, the maneuver detection model is a binary classification model that is trained to output whether or not the observation period of the inputted segment data is a period immediately after the maneuver occurrence. In this case, the maneuver detection unit 33 can suitably determine the presence or absence of the maneuver occurrence of the space object 5 during the observation period of the inputted segment data based on the classification result outputted by the maneuver detection model. The maneuver detection unit 33 supplies information regarding the detection result of the maneuver to the output control unit 34. The maneuver detection unit 33 may record information regarding the detection result of the maneuver in the observation data DB 41.

The output control unit 34 controls the output relating to the detection result of the maneuver generated by the maneuver detection unit 33. In this case, the output control unit 34 controls the display unit 25 to display information relating to the detection result of the maneuver generated by the maneuver detection unit 33, and/or controls the sound output unit 26 to output the information. Specifically, the output control unit 34 supplies the display signal based on the detection result of the maneuver to the display unit 25 via the interface 23 to thereby display a predetermined information on the display unit 25, or supplies the sound output signal based on the detection result to the sound output unit 26 via the interface 23 to thereby cause the sound output unit 26 to output a sound (which may be a warning sound or may be a guidance voice). The output control unit 34 is an example of an "output means".

Each component of the observation data acquisition unit 31, the segment data generation unit 32, the maneuver detection unit 33, and the output control unit 34 described in FIG. 5 can be realized, for example, by the processor 11 executing a program. In addition, the necessary program may be recorded in any non-volatile storage medium and installed as necessary to realize the respective components. In addition, at least a part of these components is not limited to being realized by a software program and may be realized by any combination of hardware, firmware, and software. At least some of these components may also be implemented using user-programmable integrated circuitry, such as FPGA (Field-Programmable Gate Array) and microcontrollers. In this case, the integrated circuit may be used to realize a program for configuring each of the above-described components. Further, at least a part of the components may be configured by a ASSP (Application Specific Standard Produce), ASIC (Application Specific Integrated Circuit) and/or a quantum processor (quantum computer control chip). In this way, each component may be implemented by a variety of hardware. The above is true for other example embodiments to be described later. Further, each of these components may be realized by the collaboration of a plurality of computers, for example, using cloud computing technology.

(4) Output Control

Next, the output control by the output control unit 34 will be specifically described.

The output control unit 34 controls the display unit 25 to display information on the detection result of the maneuver generated by the maneuver detection unit 33. In this case, the output control unit 34 may display a graph or a table indicating the transition of the time series detection results of the maneuver generated by the maneuver detection unit 33 on the display unit 25.

FIG. 6 is an example of a table showing the transition of the detection results of the maneuver outputted by the output control unit 34. The table shown in FIG. 6 includes items of "time" and "whether maneuver detected or not". For example, a record is generated for each piece of segment data generated by the segment data generation unit 32.

The "time" indicates the representative time of a plurality of observation times corresponding to the observation data Da included in the corresponding segmental data. In this case, the output control unit 34 may determine the representative time based on any rule from the plurality of observation times described above. For example, the output control unit 34 may set the earliest or latest time of the above-described plurality of observation times as the representative time, or may set the median value of the above-described plurality of observation times as the representative time. The output control unit 34 may provide, instead of the item "time", an item "time slot" which indicates a time slot (time period) identified by both of the earliest time and the latest time among the plurality of observation times as an item of the table, similar to the table of the classification result shown in FIG. 4.

The item "whether maneuver detected or not" indicates the presence or absence of detection of a maneuver determined by the maneuver detection unit 33 based on the corresponding segment data. Here, if the maneuver is undetected (i.e., the time is not immediately after the occurrence of the maneuver), it becomes "0", and when the maneuver is detected (i.e., the time is immediately after the occurrence of the maneuver), it becomes "1". The output control unit 34 may highlight records, in which the item "whether maneuver detected or not" is set to "1", as records to be noted.

Instead of displaying the transition of the detection results of the maneuver, the output control unit 34 may perform display or sound output for notifying the user that a maneuver has occurred, upon detecting the maneuver based on the latest segment data. Thus, the output control unit 34 can promptly notify the user of the occurrence of the maneuver.

The output control unit 34 may store the detection result of the maneuver in the storage device 4 instead of outputting the detection result of the maneuver by the display unit 25 or the sound output unit 26, or may transmit the detection result to another device (which can be a terminal or the like usable by the user) for managing the state of the space object 5.

(5) Learning Process

Figure 7:
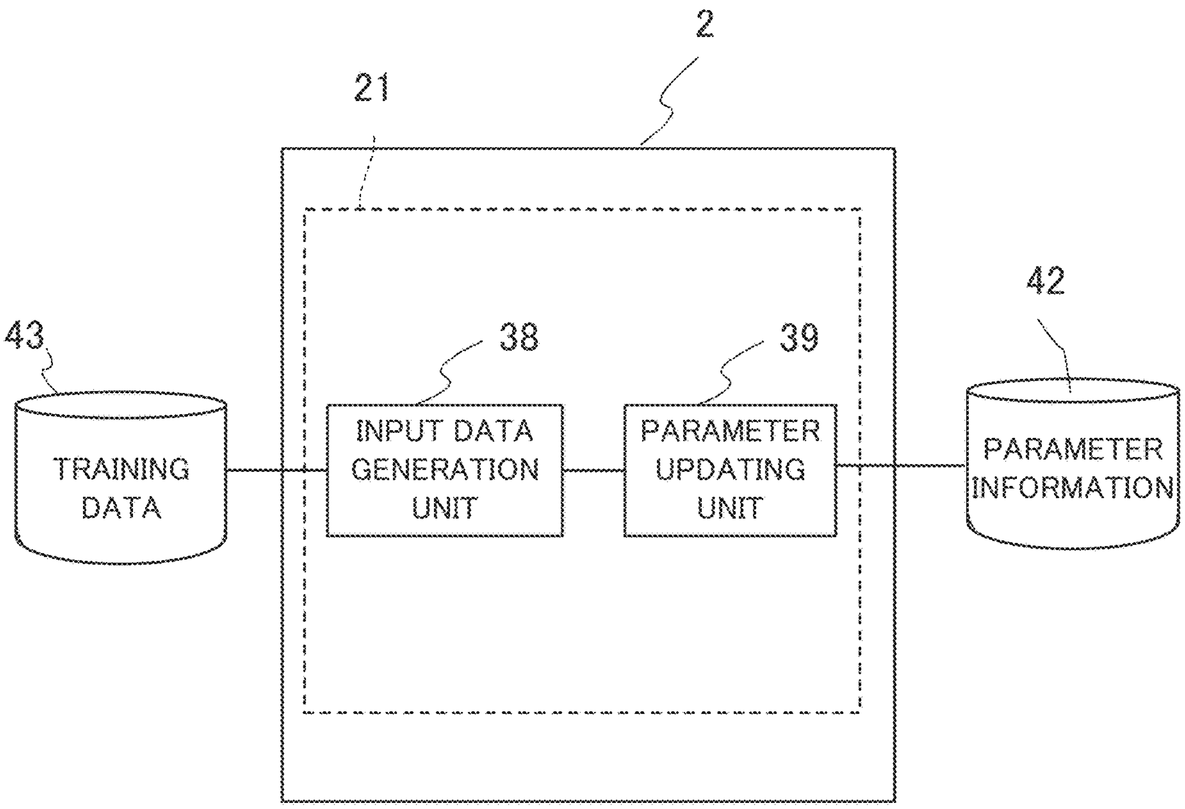
FIG. 7 It is a diagram showing an outline of a learning process of the maneuver detection model.

Next, the learning process of the maneuver detection model will be supplemented. FIG. 7 is a diagram illustrating an outline of a learning process of the maneuver detection model executed by the information processing device 2. In the learning process, the processor 21 of the information processing device 2 is equipped with an input data generation unit 38 and a parameter updating unit 39.

The training data 43 includes time series data in which luminous intensity, right ascension, and declination of the space object 5 observed during a certain period in the past are associated with each observation time, and correct answer data (correct answer flag) indicating whether or not the period was immediately after the maneuver of the space object 5. For example, similar to the data format shown in FIG. 6, the correct answer data is time series data of correct answer values each indicating whether or not each observation time (time stamp) is immediately after maneuver by binary value. The time period indicated by the correct answer data as immediately after the maneuver may be set to a time period with a certain length (e.g., one hour immediately after the maneuver).

Then, the input data generation unit 38 generates the input data which conforms to the input format of the maneuver detection model from time series data indicating the luminous intensity, right ascension, and declination. For example, the input data generation unit 38 generates, as the input data, the segment data generated from the time series data by the same process as the segment data generation unit 32. As another example, if the segment data which conforms to the input format of the maneuver detection model is previously included in the training data 43 as time series data indicating luminous intensity, right ascension, and declination, the input data generation unit 38 extracts the segment data to be inputted to the maneuver detection model from the training data 43 in order.

The parameter updating unit 39 calculates an error (loss) between a correct answer value (binary value) indicated by the correct answer data and data (herein binary value indicating whether or not it is immediately after the maneuver) outputted from the maneuver detection model when the data supplied from the input data generation unit 38 is inputted to the maneuver detection model as the input data. Then, the parameter updating unit 39 determines the parameters of the maneuver detection model so that the calculated error (loss) is minimized. The algorithm for determining the parameters to minimize the loss may be any learning algorithm used in machine learning, such as the gradient descent method and the error back propagation method. The parameter updating unit 39 updates the parameter information 42 according to the determined parameters.

The learning process of the maneuver detection model may be executed by a device other than the information processing device 2. In this case, a device other than the information processing device 2 executes the learning process described above before executing the maneuver detection related process by the information processing device 2, and the parameter information 42 obtained by the learning process is stored in the storage device 4.

(6) Processing Flow

Figure 8:
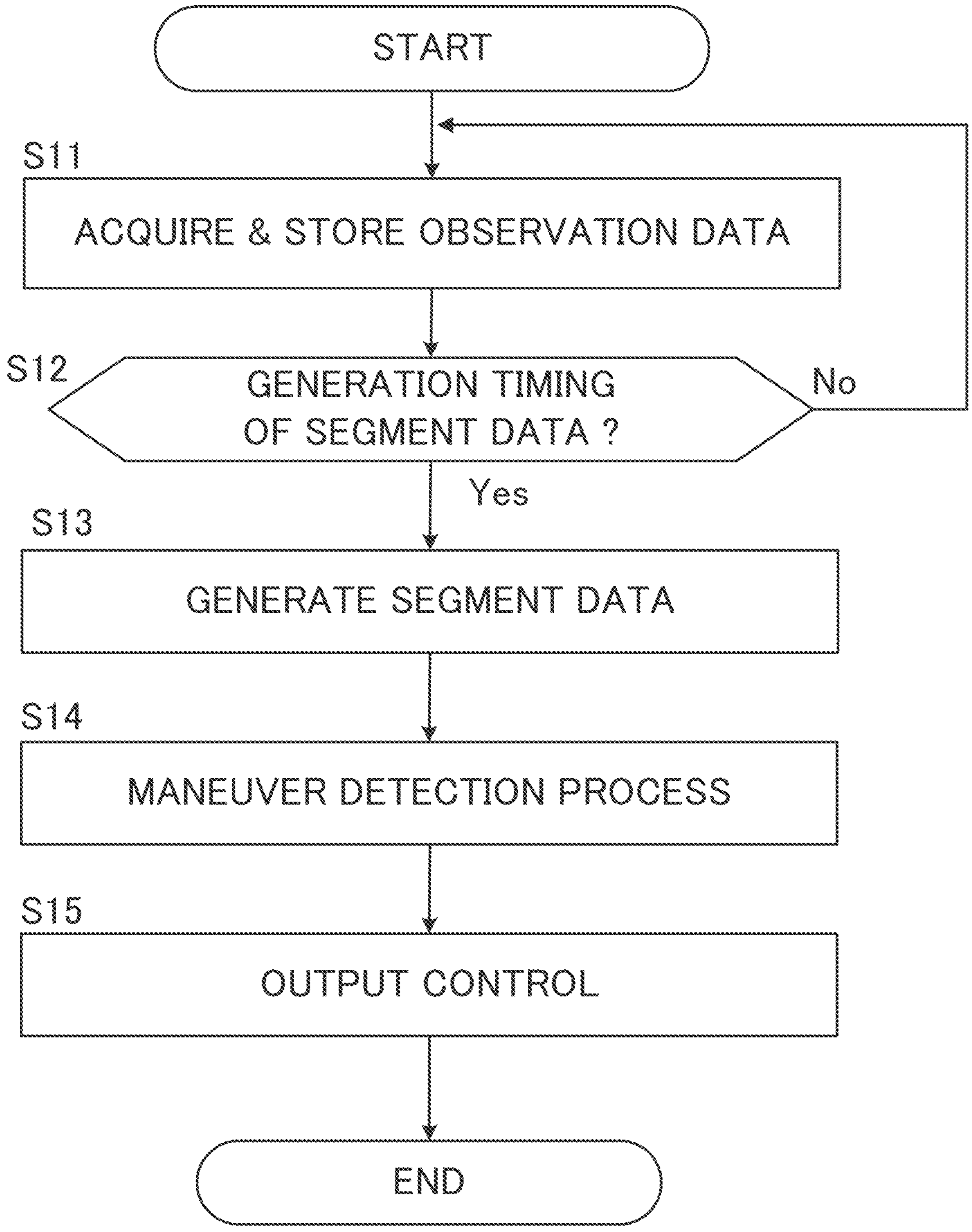
FIG. 8 It illustrates an example of a flowchart of the maneuver detection related process.

FIG. 8 is an example of a flowchart of maneuver detection related process. The information processing device 2 repeatedly executes the processing of the flowchart shown in FIG. 8.

First, the information processing device 2 acquires the observation data Da from the optical observation device 1, and stores the acquired observation data Da in the observation data DB 41 (step S11).

Next, the information processing device 2 determines whether or not the generation timing of the segment data has come up (step S12). For example, upon determining that a predetermined number of the observation data Da which are needed to generated the segment data is accumulated, the information processing device 2 determines that the generation timing of the segment data has come up. In another example, upon detecting that the acquisition interval of the observation data Da is equal to or longer than a predetermined interval, the information processing device 2 determines that the generation timing of the segment data has come up and generates the segment data based on the observation data Da acquired immediately before the acquisition interval is equal to or longer than the predetermined interval. In yet another example, upon detecting an external input (including a user input by the input unit 24) requesting the output of the detection result of the maneuver, the information processing device 2 generates segment data from the observation data Da stored in the observation data DB 41. In this case, when information specifying a time period is included in the external input, the information processing device 2 may extract the observation data Da corresponding to the specified time period from the observation data DB 41 and generate the segment data from the extracted observation data Da. Upon determining that the generation timing of the segment data has come up (step S12; Yes), the information processing device 2 generates the segment data based on the observation data Da acquired at step S11 (step S13). On the other hand, upon determining that the generation timing of the segment data has not come up yet (step S12; No), the information processing device 2 performs the processes at step S11 and step S12.

After generating the segment data, the information processing device 2 performs a process of detecting a maneuver of the space object 5 based on the generated segment data (step S14). In this case, the information processing device 2 determines whether or not the time corresponding to the segment data is the time immediately after the maneuver, based on the data outputted by the maneuver detection model when the segment data is inputted to the maneuver detection model configured using the parameter information 42.

Then, the information processing device 2 performs the output control related to the detection result of the maneuver at step S14 (step S15). In this case, for example, the information processing device 2 displays the transition of the time series maneuver detection results, or notifies, by display or audio output, the user that the maneuver has occurred.

(7) Modifications

A description will be given of preferred modifications to the example embodiment described above. The following modifications may be applied to the above-described example embodiment in combination.

(First Modification)

The information processing device 2 may convert the segment data into feature data representing features through any feature extraction process or addition of lag features. In this case, the feature data is data in a predetermined tensor format to conform to the input format of the maneuver detection model.

Figure 9:
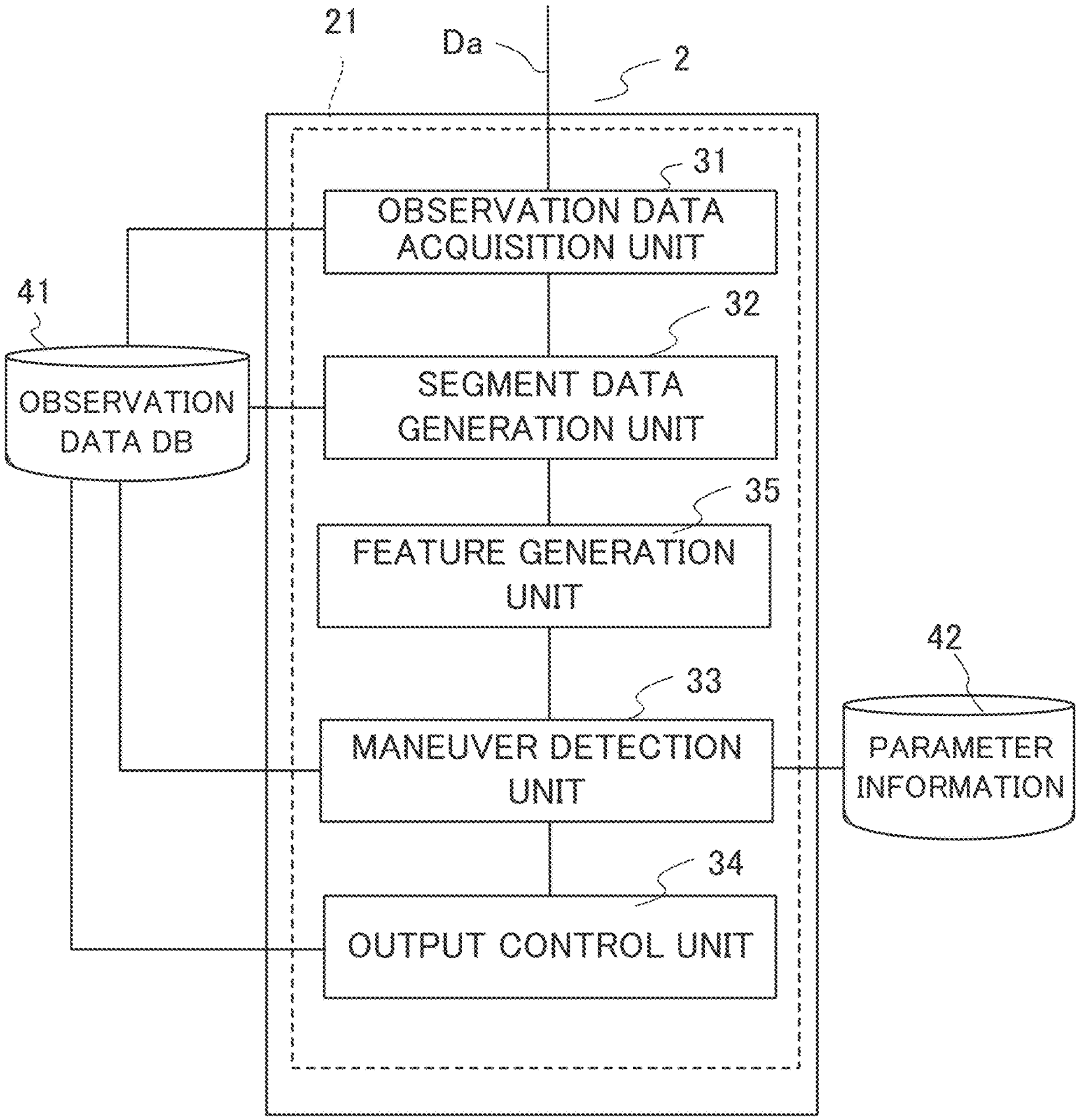
FIG. 9 It illustrates an example of function blocks related to the maneuver detection related process according to a modification.

FIG. 9 illustrates an example of functional blocks relating to the maneuver detection related process executed by the processor 21 of the information processing device 2 according to this modification. The processor 21 includes a feature generation unit 35 in addition to the processing units 31 to 34 shown in FIG. 4. The feature generation unit 35 converts the segment data generated by the segment data generation unit 32 into the feature data which conforms to the input format of the maneuver detection model. In this case, based on any feature extraction technique, the feature generation unit 35 may generate the feature data from the segment data. The feature generation unit 35 may generate data, in which the lag features are added to the segment data or its features, as the feature data. Here, the lag features are generated based on, for example, a predetermined number of segment data generated immediately before the target segment data. Then, the feature generation unit 35 supplies the generated feature data to the maneuver detection unit 33. Thereafter, the maneuver detection unit 33 detects the maneuver of the space object 5 based on the data outputted by the maneuver detection model when the feature quantity data is inputted to the maneuver detection model.

According to this modification, the information processing device 2 can detect the occurrence of the maneuver of the space object 5 with higher accuracy.

(Second Modification)

The data structure of the observation data Da is not limited to that shown in FIG. 2. For example, the observation Da may not include information regarding the luminous intensity. In this instance, based on the observation data Da, the information processing device 2 generates segment data which is time series data of the observed positions (red ascension and declination) associated with each observation time. Then, based on the segment data and the maneuver detection model, the information processing device 2 classifies whether or not a maneuver has occurred. In this modification, the information processing device 2 can also perform maneuver detection. In some embodiments, the observed position may be relative position coordinates with reference to a particular celestial body or an object.

(Third Modification)

The information processing device 2 may use orbit information supplied from the space object 5 for maneuver detection. In this case, for example, the information processing device 2 generates segment data that is time series data indicating; the luminous intensity, the red ascension, and the declination which are included in the observation data Da; and the position of the space object 5 based on the orbit information. Then, the information processing device 2 inputs the generated segment data or its feature data to the maneuver detection model to thereby acquire the classification result relating to the maneuver detection therefrom. In this case, the maneuver detection model is trained based on the training data 43 including the orbit information.

The information processing device 2 may use information regarding space weather for maneuver detection in place of or in addition to the orbit information. In this case, the information processing device 2 generates the segment data which is time series data including the space weather. Then, the information processing device 2 inputs the segment data or its feature data to the maneuver detection model to thereby acquire the classification result relating to the maneuver detection therefrom. In this case, the maneuver detection model is trained based on training data 43 which includes information regarding space weather.

Second Example Embodiment

Figure 10:
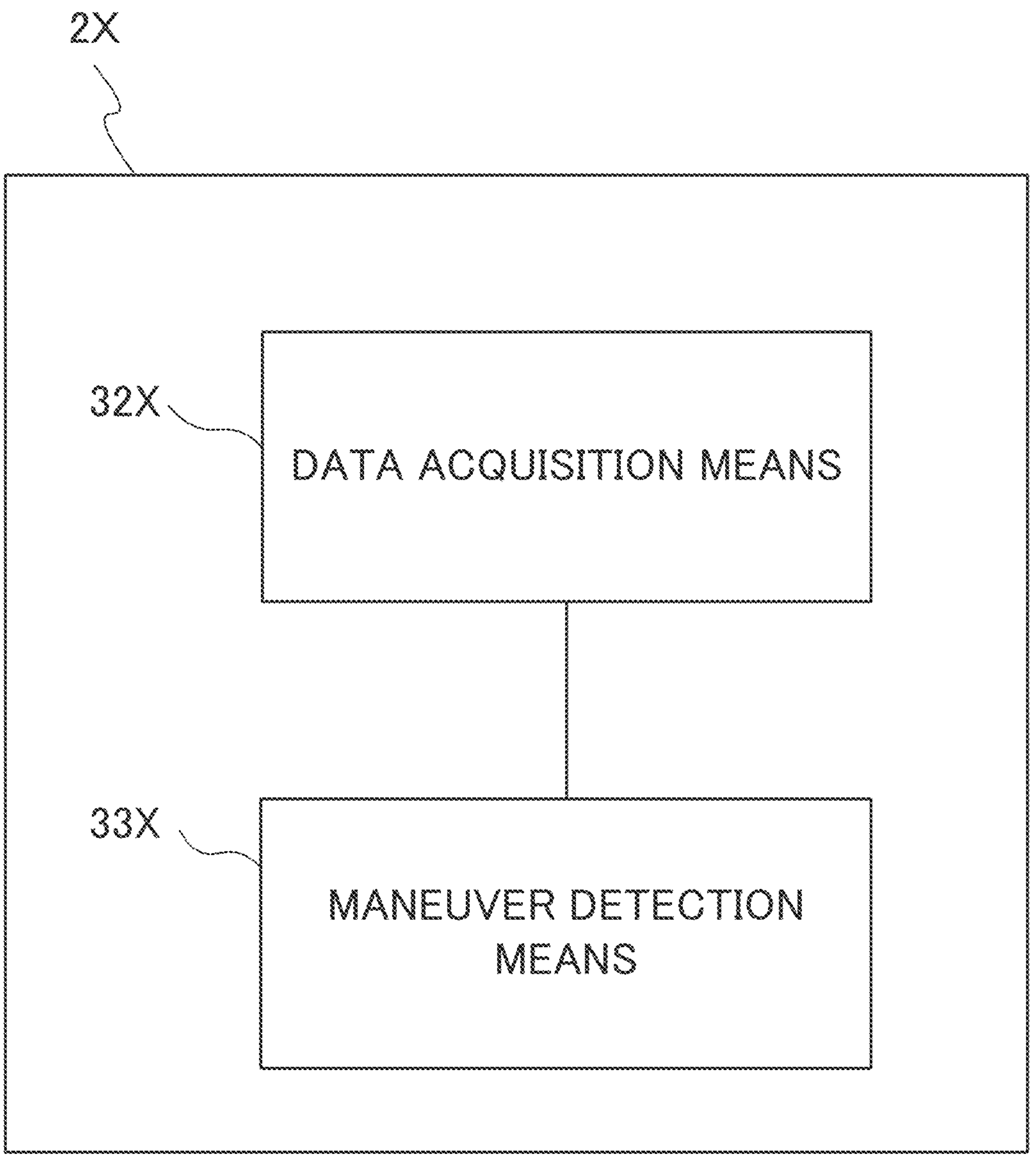
FIG. 10 It is a block diagram of an information processing device according to a second example embodiment.

FIG. 10 is a block diagram of an information processing device 2X according to a second example embodiment. The information processing device 2X includes a data acquisition means 32X and a maneuver detection means 33X. The information processing device 2X may be configured by a plurality of devices.

The data acquisition means 32X is configured to acquire time series data indicating an observed position and time of a space object equipped with a propulsion system. Examples of the data acquisition means 32X include the observation data acquisition unit 31 or the segment data generation unit 32 in the first example embodiment (including modifications, hereinafter the same.).

The maneuver detection means 33X is configured to detect a maneuver by use of the propulsion system of the space object, based on the time series data. Examples of the maneuver detection means 33X include the maneuver detection unit 33 according to the first example embodiment.

Figure 11:
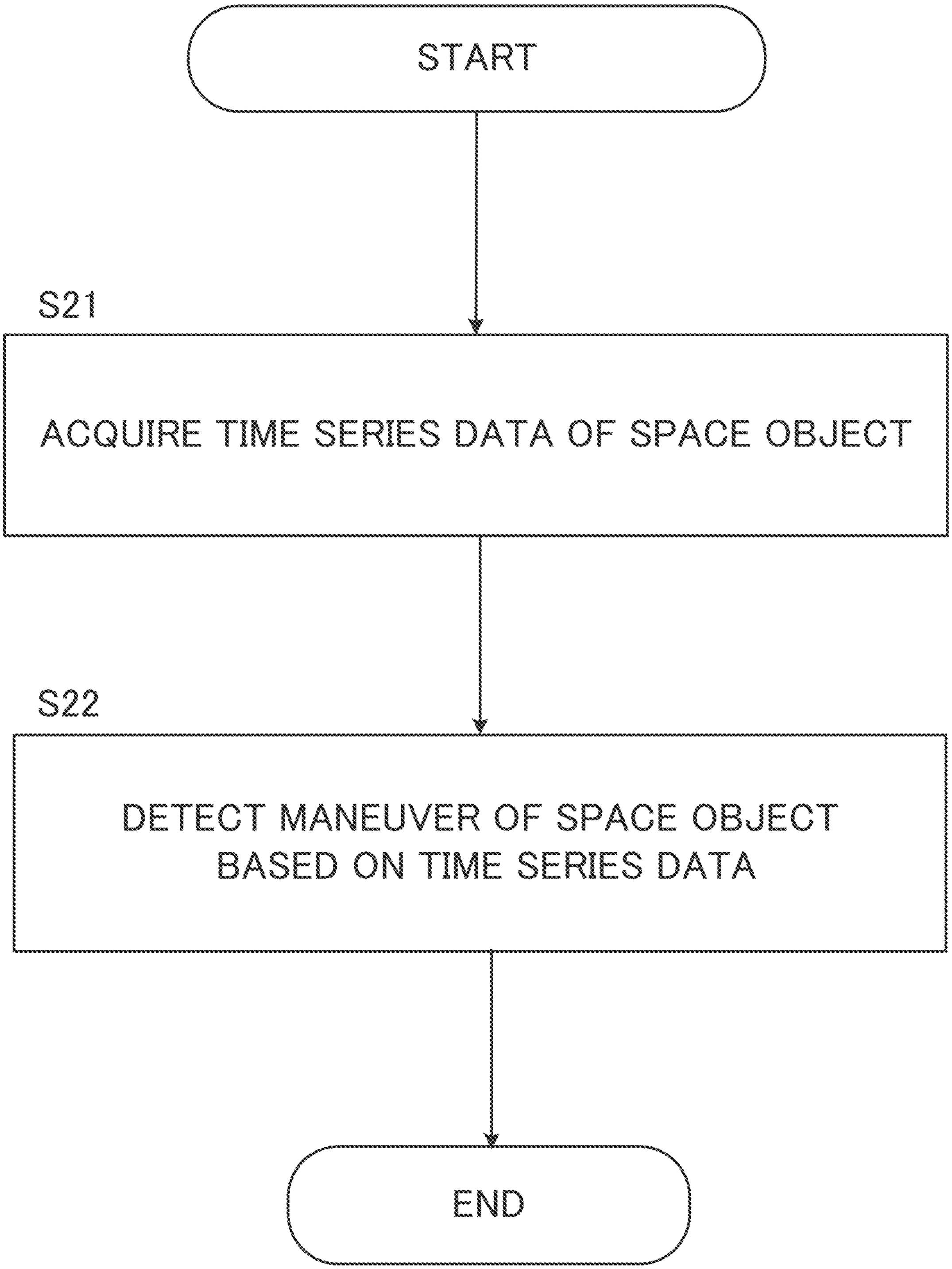
FIG. 11 It illustrates an example of a flowchart showing a processing procedure in the second example embodiment.

FIG. 11 is an example of a flowchart showing a processing procedure in the second example embodiment. First, the data acquisition means 32X acquires time series data indicating an observed position and time of a space object equipped with a propulsion system (step S21). Then, the maneuver detection means 33X detects a maneuver by use of the propulsion system of the space object, based on the time series data (step S22).

According to the second example embodiment, the information processing device 2X can suitably detect a maneuver of a space object.

In the example embodiments described above, the program is stored by any type of a non-transitory computer-readable medium (non-transitory computer readable medium) and can be supplied to a control unit or the like that is a computer. The non-transitory computer-readable medium include any type of a tangible storage medium. Examples of the non-transitory computer readable medium include a magnetic storage medium (e.g., a flexible disk, a magnetic tape, a hard disk drive), a magnetic-optical storage medium (e.g., a magnetic optical disk), CD-ROM (Read Only Memory), CD-R, CD-R/W, a solid-state memory (e.g., a mask ROM, a PROM (Programmable ROM), an EPROM (Erasable PROM), a flash ROM, a RAM (Random Access Memory)). The program may also be provided to the computer by any type of a transitory computer readable medium. Examples of the transitory computer readable medium include an electrical signal, an optical signal, and an electromagnetic wave. The transitory computer readable medium can provide the program to the computer through a wired channel such as wires and optical fibers or a wireless channel.

The whole or a part of the example embodiments described above can be described as, but not limited to, the following Supplementary Notes.

Supplementary Note 1

An information processing device comprising:
- a data acquisition means configured to acquire time series data indicating an observed position and time of a space object equipped with a propulsion system; and
- a maneuver detection means configured to detect a maneuver by use of the propulsion system of the space object, based on the time series data.

Supplementary Note 2

The information processing device according to Supplementary Note 1,
- wherein the maneuver detection means is configured to detect the maneuver based on the time series data and a learning model, and
- wherein the learning model is a model which learned a relation between
  - data obtained by observing the space object in time series and
  - a presence or absence of occurrence of the maneuver at an observation time of the data.

Supplementary Note 3

The information processing device according to Supplementary Note 1 or 2,
- wherein the time series data includes the position, the time, and an observed luminous intensity of the space object, and
- wherein the maneuver detection means is configured to detect the maneuver based on the time series data.

Supplementary Note 4

The information processing device according to any one of Supplementary Notes 1 to 3, the data acquisition means is configured to acquire, as the time series data, segment data segmented into a predetermined number of time series observation data of the space object, wherein the maneuver detection means is configured to detect the maneuver based on the segment data.

Supplementary Note 5

The information processing device according to any one of Supplementary Notes 1 to 3, wherein the data acquisition means is configured to acquire, as the time series data, segment data obtained by dividing time series observation data of the space object based on observation intervals, and wherein the maneuver detection means is configured to detect the maneuver based on the segment data.

Supplementary Note 6

The information processing device according to Supplementary Note 4 or 5, further comprising a feature generation means configured to generate feature data indicating features of the segment data, wherein the maneuver detection means is configured to detect the maneuver based on the feature data.

Supplementary Note 7

The information processing device according to Supplementary Note 6, wherein the feature generation means is configured to generate the feature data including lag features of the segment data.

Supplementary Note 8

The information processing device according to any one of Supplementary Notes 1 to 7, further comprising:

an output means configured to output information indicating that the maneuver is detected if the maneuver is detected.

Supplementary Note 9

The information processing device according to any one of Supplementary Notes 1 to 8, wherein the data acquisition means is configured to acquire the time series data including at least one of orbit information of the space object and/or a space weather, and wherein the maneuver detection means is configured to detect the maneuver based on the time series data.

Supplementary Note 10

A detection method executed by a computer, the detection method comprising:

acquiring time series data indicating an observed position and time of a space object equipped with a propulsion system; and detecting a maneuver by use of the propulsion system of the space object, based on the time series data.

Supplementary Note 11

A storage medium storing a program executed by a computer, the program causing the computer to:

acquire time series data indicating an observed position and time of a space object equipped with a propulsion system; and detect a maneuver by use of the propulsion system of the space object, based on the time series data.

Supplementary Note 12

An information processing system comprising:

a data acquisition means configured to acquire time series data indicating an observed position and time of a space object equipped with a propulsion system; and a maneuver detection means configured to detect a maneuver by use of the propulsion system of the space object, based on the time series data.

Supplementary Note 13

The information processing system according to Supplementary Note 12, wherein the maneuver detection means is configured to detect the maneuver based on the time series data and a learning model, and wherein the learning model is a model which learned a relation between data obtained by observing the space object in time series and a presence or absence of occurrence of the maneuver at an observation time of the data.

Supplementary Note 14

The information processing system according to Supplementary Note 12 or 13, wherein the time series data includes the position, the time, and an observed luminous intensity of the space object, and wherein the maneuver detection means is configured to detect the maneuver based on the time series data.

Supplementary Note 15

The information processing system according to any one of Supplementary Notes 12 to 14, the data acquisition means is configured to acquire, as the time series data, segment data segmented into a predetermined number of time series observation data of the space object, wherein the maneuver detection means is configured to detect the maneuver based on the segment data.

Supplementary Note 16

The information processing system according to any one of Supplementary Notes 12 to 14, wherein the data acquisition means is configured to acquire, as the time series data, segment data obtained by dividing time series observation data of the space object based on observation intervals, and wherein the maneuver detection means is configured to detect the maneuver based on the segment data.

Supplementary Note 17

The information processing system according to Supplementary Note 15 or 16, further comprising a feature generation means configured to generate feature data indicating features of the segment data, wherein the maneuver detection means is configured to detect the maneuver based on the feature data.

Supplementary Note 18

The information processing system according to Supplementary Note 17, wherein the feature generation means is configured to generate the feature data including lag features of the segment data.

Supplementary Note 19

The information processing system according to any one of Supplementary Notes 12 to 18, further comprising:

an output means configured to output information indicating that the maneuver is detected if the maneuver is detected.

Supplementary Note 20

The information processing system according to any one of Supplementary Notes 12 to 19, wherein the data acquisition means is configured to acquire the time series data including at least one of orbit information of the space object and/or a space weather, and wherein the maneuver detection means is configured to detect the maneuver based on the time series data.

While the invention has been particularly shown and described with reference to example embodiments thereof, the invention is not limited to these example embodiments. It will be understood by those of ordinary skilled in the art that various changes in form and details may be made therein without departing from the spirit and scope of the present invention as defined by the claims. In other words, it is needless to say that the present invention includes various modifications that could be made by a person skilled in the art according to the entire disclosure including the scope of the claims, and the technical philosophy. All Patent and Non-Patent Literatures mentioned in this specification are incorporated by reference in its entirety.

DESCRIPTION OF REFERENCE NUMERALS

1 Optical observation device
2 Information processing device
4 Storage device
21 Processor
22 Memory
23 Interface
24 Input unit
25 Display unit
26 Sound output unit
41 Observation data DB
42 Parameter information
43 Training data
100 Observation system

What is claimed is:

1. An information processing device comprising:

at least one memory configured to store instructions; and at least one processor configured to execute the instructions to:

acquire time series data indicating an observed position, an observed luminous intensity measured by a sensor, and time of a space object equipped with a propulsion system;

generate, from the time series data, segment data each corresponding to a respective time period by dividing the time series data based on a discontinuity in observation intervals where a duration between consecutive observation times is equal to or greater than a predetermined time length; and detect a maneuver by use of the propulsion system of the space object, based on the time series data by inputting the segment data to a trained learning model and determining, based on an output of the trained learning model, whether the respective time period corresponding to the segment data is a period immediately after occurrence of an orbital maneuver, wherein the at least one processor is further configured to execute the instructions to output information indicating that the maneuver is detected based on the maneuver being detected.

2. The information processing device according to claim 1, wherein the at least one processor is configured to execute the instructions to detect the maneuver based on the time series data and a learning model, and wherein the time series data is derived from observation data supplied from an optical observation device that optically observes the space object, and wherein the learning model is a model which learned a relation between data obtained by observing the space object in time series and a presence or absence of occurrence of the maneuver at an observation time of the data.

3. The information processing device according to claim 1, wherein the at least one processor is configured to execute the instructions to acquire, as the time series data, segment data obtained by dividing time series observation data of the space object based on observation intervals, and wherein the at least one processor is configured to execute the instructions to detect the maneuver based on the segment data.

4. The information processing device according to claim 1, the at least one processor is configured to execute the instructions to generate feature data indicating features of the segment data, wherein the at least one processor is configured to execute the instructions to detect the maneuver based on the feature data.

5. The information processing device according to claim 4, wherein the at least one processor is configured to execute the instructions to generate the feature data including lag features generated based on a predetermined number of segment data generated immediately before a target segment data.

6. A detection method executed by a computer, the detection method comprising:

acquiring time series data indicating an observed position, an observed luminous intensity measured by a sensor, and time of a space object equipped with a propulsion system;

generating, from the time series data, segment data each corresponding to a respective time period by dividing the time series data based on a discontinuity in observation intervals where a duration between consecutive observation times is equal to or greater than a predetermined time length;

detecting a maneuver by use of the propulsion system of the space object, based on the time series data by inputting the segment data to a trained learning model and determining, based on an output of the trained learning model, whether the respective time period corresponding to the segment data is a period immediately after occurrence of an orbital maneuver; and outputting information indicating that the maneuver is detected based on the maneuver being detected.

7. A non-transitory computer readable storage medium storing a program executed by a computer, the program causing the computer to:

acquire time series data indicating an observed position, an observed luminous intensity measured by a sensor, and time of a space object equipped with a propulsion system;

generate, from the time series data, segment data each corresponding to a respective time period by dividing the time series data based on a discontinuity in observation intervals where a duration between consecutive observation times is equal to or greater than a predetermined time length; and detect a maneuver by use of the propulsion system of the space object, based on the time series data by inputting the segment data to a trained learning model and determining, based on an output of the trained learning model, whether the respective time period corresponding to the segment data is a period immediately after occurrence of an orbital maneuver, wherein the program further causes the computer to output information indicating that the maneuver is detected based on the maneuver being detected.

* * * * *